Dec. 2, 1941.  T. J. SMULSKI  2,264,487
ELECTRICAL SYSTEM
Filed Nov. 6, 1939  2 Sheets—Sheet 1

Inventor
Theodore J. Smulski
By Alois W. Graf
Attys.

Dec. 2, 1941.  T. J. SMULSKI  2,264,487
ELECTRICAL SYSTEM
Filed Nov. 6, 1939  2 Sheets-Sheet 2
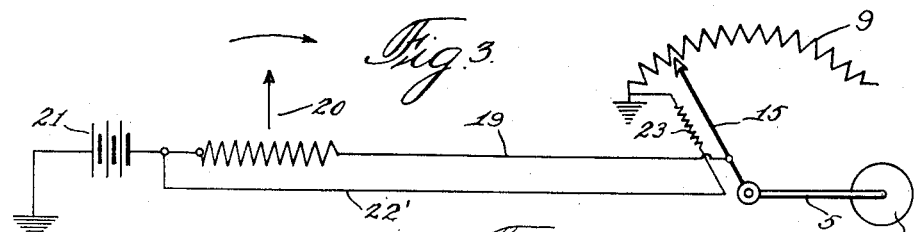
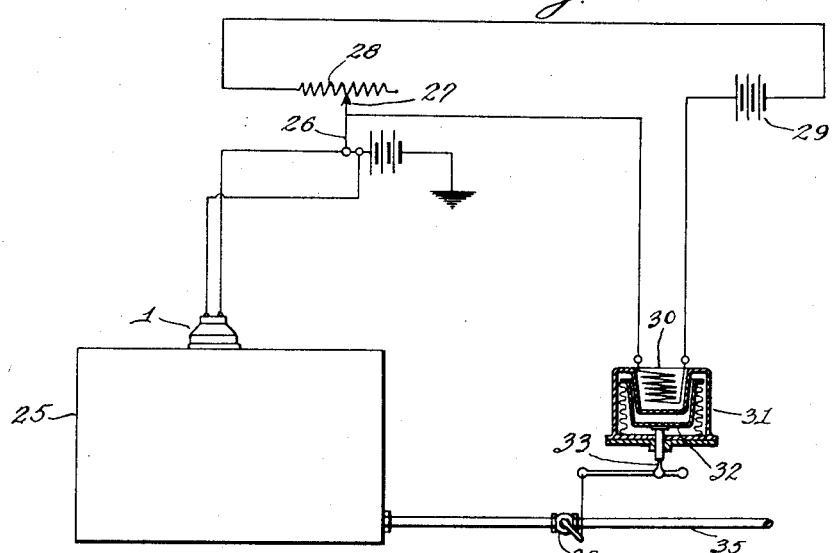
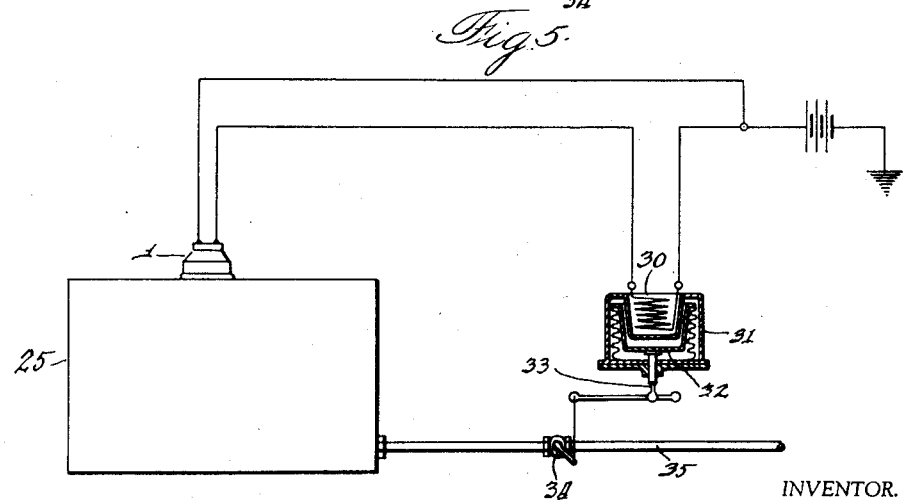
INVENTOR.
Theodore J. Smulski.
BY
Alois W. Graf
ATTORNEY.

Patented Dec. 2, 1941

2,264,487

UNITED STATES PATENT OFFICE 2,264,487

ELECTRICAL SYSTEM

Theodore J. Smulski, Knox, Ind., assignor to The Anderson Company, a corporation of Indiana Application November 6, 1939, Serial No. 303,035

13 Claims. (Cl. 177—351)

This invention relates to electrical systems, with particular reference to electro-thermal apparatus adapted to accurately position a movable element in correspondence with variations of a physical condition at a point remote from the manifestation of the physical condition.

The invention has particular application to electro-thermal apparatus actuated by a power source of varying voltage, such as the battery of an automotive vehicle, and wherein compensating means are provided for rendering the position of the movable element corresponding to a given physical condition substantially constant despite voltage fluctuation.

The invention further comprehends the employment of thermostatic means adapted to be electro-thermally heated and wherein the thermostatic means are substantially uninfluenced by ambient temperature variations.

It is an object of the present invention to provide an electro-thermal system including a movable element wherein the movable element may be controlled commensurately to the effect of a physical condition at a point disposed remotely to said element.

The invention is adaptable for various uses requiring the accurate control of a movable element in accordance with variations of a physical condition at a remote point and in which the effect of various factors other than the physical condition tend to prevent accurate positioning of the movable element. In the present embodiment a device is arranged to effect remote indication of the quantitative value of a physical condition such as variation in the liquid level or any other physical condition capable of exerting movement of an element at a controlling station in accordance with the variation of the condition. Although the movable element at the point remote from the control station is illustrated as an indicating arm it is understood that the arm may have a controlling function rather than an indicating function wherein the physical condition may be controlled in accordance with the position of the movable arm rather than being merely indicated.

Another object is to employ in electrical systems of the above type comprising a movable element remote from the control station means arranged to automatically compensate for inaccuracies normally caused by variable factors in a system other than the primary physical condition.

Another object is to effect accurate graduated control of the indicating element of an electrical instrument such as an ammeter under the joint effects of means arranged to vary a circuit characteristic in response to a variable condition, ambient thermal effects tending to prevent the accurate characteristic variation, and the effect of a varying electrical condition in the instrument circuit.

Further objects will be apparent from the specification and appended claims.

In the drawings:

Fig. 3 is a schematic drawing of the mechanism illustrated in Figs. 1 and 2;

Figures 1, 2:
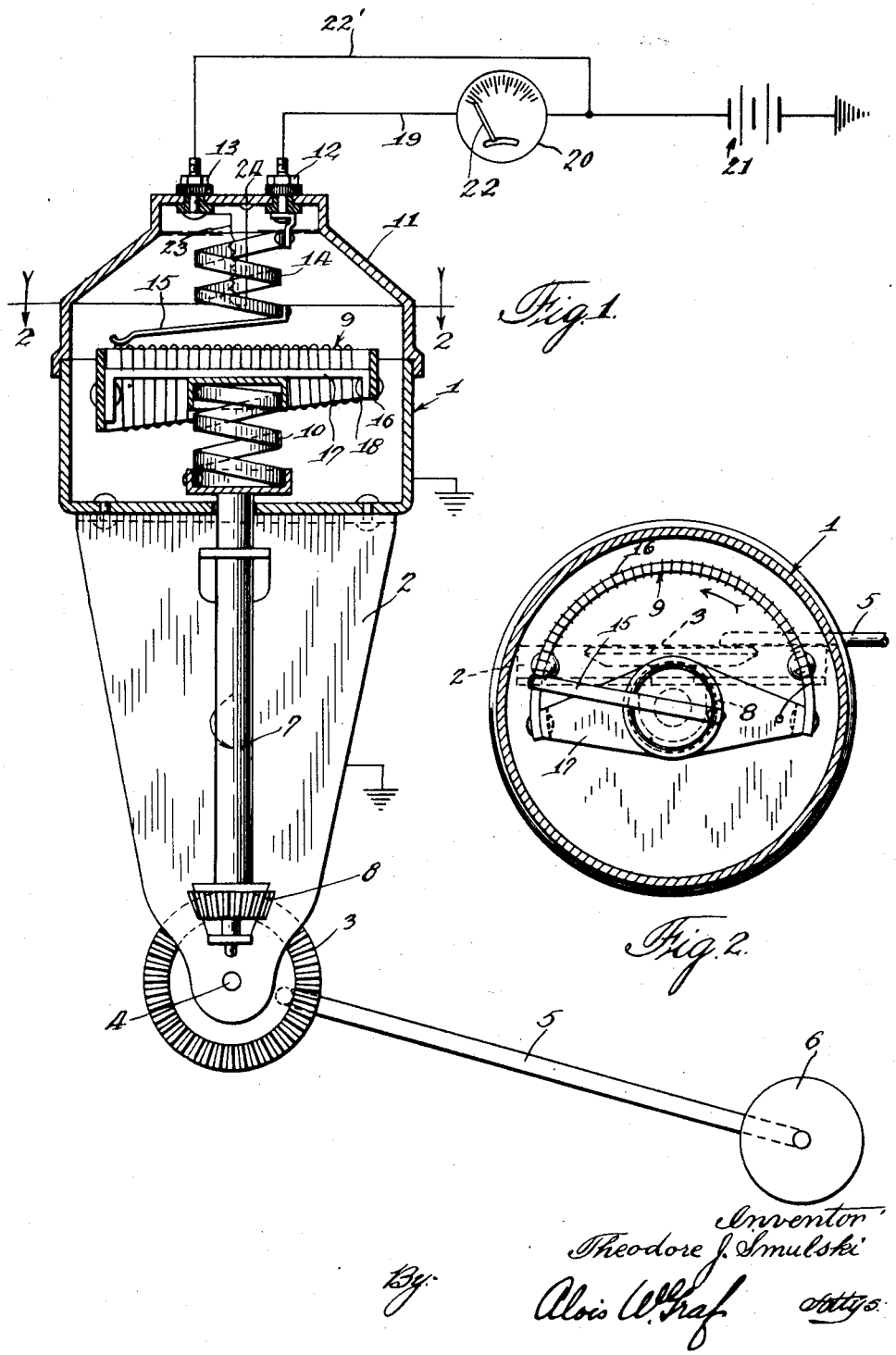
Fig. 1 is a diagrammatic view of one embodiment of the system and mechanism therefor as adapted for use in connection with the measurement of a variable liquid level.
Fig. 2 is a transverse sectional view taken on a line substantially corresponding to line 2—2 of Fig. 1.

Fig. 4 is a view, mainly diagrammatic, showing my invention incorporated in apparatus controlling a supply of liquid to a container responsive to variations in liquid level of the container and wherein the motor means controlling the fuel supply is operated from an independent circuit; and Fig. 5 is a view generally similar to Fig. 4 wherein the power operating the fuel control motor means is taken from the controller circuit.

Referring to the drawings in detail, the embodiment illustrated is particularly adapted for use as a liquid level indicator, such as a so-called "gauge" for the gasoline tank of an automobile, and is arranged to provide a constant accurate indication of the liquid level in the tank. The device as illustrated comprises a casing 1 provided with a downwardly extending bracket 2. This casing may be mounted so that the bracket 2 normally extends into the tank. A bevel gear 3 is pivotally mounted at 4 on the bracket. The gear 3 is provided with the usual arm 5 having a float 6 secured thereto, the position of the float 6 in the tank being controlled by the level of the liquid therein.

A vertically mounted shaft 7 rotates in suitable bearings on the bracket 2 and is provided at its lower end with a pinion 8 that meshes with the gear 3. Thus the shaft 7 is rotated in accordance with the movement of the float 6 in response to variations in the liquid level. The shaft 7 extends upwardly into the casing 1, and a rheostat 9 is mounted thereon by means of a coiled bimetallic thermostatic element 10 interposed between the shaft and the rheostat and secured to the thermostat and to the top of the shaft 7. It will be obvious, therefore, that the rheostat 9 will rotate in accordance with the movement of the float 6 and this movement may be modified by the coiled thermostatic element 10 that expands and contracts in response to the ambient temperature within the casing 1; that is, the position of the zone of movement of the rheostat 9 will be varied by the element 10 due to rotative movement responsive to ambient temperature variation, although the limits of said zone will remain the same as controlled by the float.

The casing 1 is provided with a cover 11, on which is mounted two insulated terminals 12 and 13. A second coiled bimetallic thermostatic element 14 is secured at its upper end to the terminal 12. The lower end of the element 14 is free and is provided with an outwardly extending contact member 15 which engages in wiping contact with the rheostat 9, the latter being preferably so wound or arranged that the resistance of the circuit comprising the contact arm 15 is decreased by logarithmic increments as the rheostat moves in response to a rising liquid level, and the resistance is, therefore, logarithmically increased during the rheostat movement in response to a lowering level of the liquid. It will also be apparent that the variation of resistance which would normally be caused by the rotation of the rheostat 9 will be modified in accordance with the ambient temperature within the casing because of the thermal response of the thermostats 10 and 14.

The rheostat 9 may be of any suitable type, but is preferably a wire wound on a strip of insulation 16 bent into arcuate form and which is secured to a metal cross-arm 17 mounted in any convenient manner upon the upper end of the thermostatic coil 10. One end of the rheostat wire is grounded at 18 on the cross bar 17. A conductor 19 is electrically connected to the terminal 12 and extends from an ammeter 20 that is connected in series with a suitable power source, such as a battery 21, the opposite side of the battery being grounded, as illustrated, to complete the circuit.

The ammeter 20 is preferably one of the usual well known types in which the normally retracted pointer 22 is movable over the indicator dial by means of an electrically controlled thermal element therein and in which normal inaccuracies due to variations in the ambient temperature are compensated for by means of a suitable cooperating thermostatic element. Similar instruments are disclosed and claimed in Patents Nos. 1,885,048, 1,885,049 and 1,885,052.

A shunt circuit 22 is provided around the ammeter 20 and rheostat 9 through the terminal 13 and is provided with an electrical heating element 23 preferably positioned within the coils of the thermostat 14 and grounded to the casing at 24. The shunt circuit 22 and heater 23 are provided for maintaining the current in the ammeter circuit substantially constant despite voltage variation in the power source such as the battery 21 as is normally encountered in a battery of an automotive vehicle. As is best illustrated in Fig. 1, upon an increase in voltage at the battery and consequently in the ammeter circuit and in the shunt circuit 22, the heating element 23 will be additionally heated and will in turn effect an increased heating of the thermostat 14 causing contact terminal 15 to rotate in a direction to place additional resistance in the ammeter circuit and thereby maintaining the current through the ammeter circuit substantially constant. Upon a decrease in voltage of the battery 21, the reverse will occur, and the contact terminal 15 will move in a reverse direction, cutting out a certain amount of resistance and permitting an increased current flow through the ammeter circuit.

Thus, despite voltage variations of the battery, a correct reading of the ammeter 20 will be maintained.

Each thermostat 10 and 14 is preferably a bimetallic helix, and both move their free ends in the same direction in response to variations in temperature; that is, the thermostat 14 causes the contact terminal 15 to rotate in one direction in response to temperature changes caused by voltage variation in combination with variations in ambient temperature, and the thermostat 10 causes the rheostat 9, which is mounted on the free end of the thermostat, to rotate in the same direction in response to a similar variation in ambient temperature only. This arrangement of the thermostats and rheostat inherently compensates for inaccuracies which would normally be caused by variations in the ambient temperature and variations of voltage in the ammeter circuit.

In operation, as the float rises in response to a rising liquid level, the shaft 7 rotates in the direction indicated by the arrow, and the rheostat, which would normally move under the contact arm 15 to a point of lower resistance and cause the indicator to show an increase in reading, will be caused to modify the rheostat movement because of the effect of the ambient temperature on thermostat 10. Simultaneously, the rheostat 14 will tend to vary the position of the arm 15 relative to ambient temperature and further correct the reading. In case the voltage is increased in the ammeter circuit, the indicator would normally be inaccurate in that it would show a higher reading due to the increased current. However, the heater 23, due to this increased current, immediately increases the temperature adjacent the thermostat 14 and the arm 15 moves to increase the resistance in the ammeter circuit and therefore holds the current constant regardless of variation in voltage.

As previously stated, the free ends of the thermostats 10 and 14 move in the same direction in response to ambient temperature. Therefore, if there is no change in either liquid level or voltage, the arm 15 will remain at a fixed point on the rheostat regardless of the movement of both in response to variations in ambient temperature; that is, they will move together in the same direction and the circuit resistance will not be varied.

It will be understood that any suitable type of thermostatic elements may be used to modify the normal movement of the resistance element and the relative position of the contact therewith. Also, the rheostat may be mounted on the element 14 and the contact on element 10, if desired.

Referring now to Fig. 4, I have illustrated a modification of my invention wherein the indicating means at the remote point on the ammeter 22, is replaced by a motor controlling supply of liquid to a tank. I have indicated at 25 a tank adapted to contain liquid such as oil, gasoline or the like and wherein it is desired that a minimum level be maintained either as a pressure head or for unusual withdrawal demands.

The controller 1 is mounted on the top of the tank and will transmit a series of current pulsations in correspondence to the position of the float arm within the tank to actuate the thermally responsive arm 26 in the same manner as the indicating arm 22 previously described is actuated. The arm 26 is provided with a contact 27 adapted to move over a resistance 28 provided in a circuit including a battery 29 and thermostatic coils 30. Although I have illustrated the source of power as a battery, it is understood that any electrical power source may be employed.

Thermostatic coils 30 are associated with a heat motor generally indicated at 31, heat motors of this type being well known and comprising an expansible fluid enclosed in a housing having a movable wall or head sealedly connected to the housing by a bellows or similar means. In the present instance, the head is indicated at 32 and has affixed thereto an arm 33 adapted to a suitable link mechanism to control a valve 34 inserted in a liquid supply line 35. Thus, the operation of the valve and resultantly the supply of liquid through the supply line 35 to tank 25 will be dependent upon the heat supplied to the thermostatic coils 30, which factor in turn is governed by the amount of resistance inserted under the control of the arm 26, which in turn is actuated in correspondence with the controller 1 at the tank.

For example, if liquid were being rapidly withdrawn from tank 25 and it were desired to maintain the liquid level at a predetermined minimum, the corresponding lower position of the float arm would, as before described, effect a corresponding opening of valve 34 and a resultant increase in the supply of liquid to the tank.

Although I have chosen the controller as effecting valve operation at a remote point, it is understood that any control means at a remote point operable by movement of an element in correspondence with variations of a physical condition at a controlling station may be similarly controlled.

Referring now to Fig. 5, I have illustrated a modification of my invention similar to that described and shown in Fig. 4 but wherein the thermostatic coil 30 is included directly in the controller rheostat circuit rather than being operated by an independent circuit under the control of the rheostat circuit, as illustrated in Fig. 4. In this modification, the ammeter 20, illustrated in Fig. 1, is merely replaced by the thermostatic coil 30 and the heat motor may be adapted to a control function as illustrated in Fig. 4.

Although I have shown and described modifications of my invention, I contemplate that numerous and extensive departures may be made therefrom without departing from the spirit of my invention or the scope of the appended claims.

Having thus described my invention, what I claim is:

1. An electrical system comprising a power source, a control device comprising a thermally responsive contact, a thermally responsive support element variably movable, means for moving the support element, a variable resistance supported by the support element and engageable by the contact, circuit conductors connecting the contact and resistance in series with the power source whereby relative movement of the contact and resistance may control the current through said circuit, electrical heating means in thermal relation to the contact, a circuit conductor connecting the electrical heating means in series with the power source whereby variation in voltage at the power source will alter the heating effect of the heating means and effect movement of the contact to maintain a substantially constant current through the circuit including the contact and variable resistance, and both the contact and support element being substantially equally responsive to thermal change to compensate for ambient temperature variation.

2. An electrical system comprising a power source, a control device, circuit conductors connecting the control device in series with the power source, said control device comprising a housing, a thermally responsive contact supported by the housing, a thermally responsive support element in the housing, a variable resistance supported by the support element and engaging the contact, means for effecting relative movement between the contact and the variable resistance to alter the current passing therethrough, electrical heating means in thermal relation to the contact, circuit conductors connecting the heating means in series with the power source whereby the contact may be moved responsive to voltage variation at the current source to maintain a substantially constant current therethrough for a given position of the resistance, and both the contact and support element being substantially equally responsive to thermal change to compensate for ambient temperature variations.

3. An electrical system comprising a power source, a control device, said control device comprising a housing, a thermally responsive contact supported by the housing, a thermally responsive support element, a movable element, means for moving the support element in accordance with the position of the movable element, a variable resistance carried by the support element and engageable by the contact, circuit conductors connecting the contact, and variable resistance in series with the power source whereby the current traversing the circuit may be controlled by relative movement between the contact and variable resistance, an electrical heating element supported by the housing in thermal relation to the contact, circuit conductors connecting the heating element in series with the power source and in parallel with the variable resistance whereby the contact may be moved to compensate for voltage variation at the power source and maintain a substantially constant current through the variable resistance for a given position of the movable element, and both the contact and support element being substantially equally movable in a given direction to compensate for ambient temperature variations.

4. An electrical system comprising a power source, a control device, circuit conductors connecting the control device in series with the power source, said control device comprising a housing, a thermally responsive contact supported by the housing having a coil portion and a contact arm movable along an arcuate path responsive to temperature variation of the coil portion, a coil form thermally responsive support element mounted in the housing, a variable resistance of arcuate form carried by the support element and engageable by the contact, a rotatable shaft secured to the support element for moving the support element and variable resistance, the resistance being adapted to be moved independently of the shaft in response to temperature variation of the support element, electrical heating means disposed in thermal relation to the coil portion of the contact and connected in series with the power source whereby the heating effect may be altered responsive to voltage variation at the power source to correspondingly move the contact relative to the resistance and maintain a substantially constant current through the variable resistance for a given position of the resistance, and the contact arm and variable resistance being adapted to be moved substantially equal amounts in the same direction due to ambient temperature variation.

5. A control device for an electrical circuit comprising a housing, a thermally responsive contact supported by the housing, a thermally responsive support element mounted in the housing, a movable element carried by the housing adapted to move the support element in correspondence therewith, a variable resistance carried by the support element and engageable by the contact, an electrical heating element disposed in thermal relation to the contact, the contact being adapted to be moved relative to the resistance in accordance with the variation in heating effect of the heating element, and both the contact and support element being movable in substantially equal amounts responsive to thermal change to compensate for ambient temperature variation.

6. An electrical system comprising a power source, a control device comprising a contact element, a variable resistance engageable by the contact element, support means for the variable resistance, means for variably moving the support means and the variable resistance, circuit conductors connecting the power source, the contact element and variable resistance in series whereby relative movement of the contact element and variable resistance may control current flow through said series circuit, and means including a circuit in series with the power source and in parallel with the contact element adapted to effect relative movement between the contact element and variable resistance to compensate for voltage variations at the power source.

7. An electrical system comprising a power source, a control device including a contact element, a variable resistance engageable by the contact element, support means for the variable resistance, means for variably moving the support means and variable resistance, circuit conductors connecting the power source, the contact element and variable resistance in series whereby relative movement of the contact element and variable resistance may control current flow through said series circuit, a thermally responsive element associated with the contact element, electrical heating means in thermal relation to said thermally responsive element and in series circuit with the power source and in parallel circuit with the contact element and variable resistance whereby voltage variation at the power source will vary the heating effect of the heating means to correspondingly effect relative movement between the contact element and variable resistance to compensate for said voltage variation.

8. An electrical system comprising a power source, a control device comprising a contact element, a variable resistance engageable by the contact element, circuit conductors connecting the power source, the contact element, and the variable resistance in series circuit, means for variably moving the variable resistance to alter the current flow through the said circuit, thermally responsive support means for the contact element, electrical heating means in thermal relation to said support means and in series circuit with the power source and parallel circuit with the contact element whereby the contact element may be moved in correspondence with voltage variation at the power source and effect a current flow commensurate to a given position of the variable resistance.

9. An electric system comprising a variably movable element, a source of electrical current, a rheostat, a heating element, and electrical circuit conductors interconnecting said source with said rheostat, and said heating element whereby current from said source will be commensurate to the adjustment of said rheostat, said movable element adapted to vary the adjustment of said rheostat commensurately to the extent of movement of the movable element from a datum position, and thermally responsive means for independently varying the adjustment of said rheostat according to the temperature of said current means, whereby said current will be controlled by the combined effects of said movable element and said thermally responsive means, said heating element being thermally associated with said thermally responsive means to thermally energize it to a degree commensurate with the voltage of said source, the effect of said thermally responsive device upon the adjustment of said rheostat being such as to cause it to compensate for variations of strength of current supplied from said source because of variations of voltage of said source.

10. In an electric circuit energized from a source of varying voltage, the method of producing substantially accurate flow of power in accordance with varying conditions which comprises varying the resistance of said circuit in accordance with the varying conditions without reference to the voltage, generating heat proportional to said varying voltage, modifying said variation in resistance in accordance with said generated heat to compensate for said voltage variations.

11. In an electric telemetric system comprising an indicator circuit energized from a source of varying voltage, the method of producing substantially accurate indications of varying conditions which comprises varying the resistance of said indicator circuit in accordance with the varying conditions to be indicated, generating heat proportional to said varying voltage, modifying said variation in resistance in accordance with the ambient temperature and said generated heat to compensate for said voltage variations, and compensating said resistance variation for ambient temperature.

12. In an electric circuit energized from a source of varying voltage, the method of producing substantially accurate flow of power in accordance with varying conditions which comprises varying the resistance of said circuit in accordance with the varying conditions without reference to the voltage, generating a force proportional to said varying voltage, modifying said variation in resistance in accordance with said generated force to compensate for said voltage variations.

13. In an electric circuit energized from a source of varying voltage, the method of producing substantially accurate flow of power in accordance with varying conditions which comprises varying the resistance of said circuit in accordance with the varying conditions without reference to said voltage, generating heat proportional to said varying voltage, modifying said variation in resistance in accordance with the ambient temperature and said generated heat to compensate for said voltage variations, and compensating said resistance variation for ambient temperature.

THEODORE J. SMULSKI.

CERTIFICATE OF CORRECTION.

Patent No. 2,264,487.  December 2, 1941.

THEODORE J. SMULSKI.

It is hereby certified that error appears in the printed specification of the above numbered patent requiring correction as follows: Page 4, second column, line 12, claim 9, strike out the word "current"; line 35, beginning with "11. In an electric" strike out all to and including the word and period "temperature." in line 47, comprising claim 11, and for the claims now numbered 12 and 13 read 11 and 12 respectively; in the heading to the printed specification, line 6, for "13 Claims" read --12 Claims--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.